Nov. 5, 1957
L. M. MERRILL
2,812,506
WATERPROOF ELECTRICAL CABLE CONNECTION
AND METHOD OF MAKING THE SAME
Filed Nov. 17, 1950
2 Sheets-Sheet 1
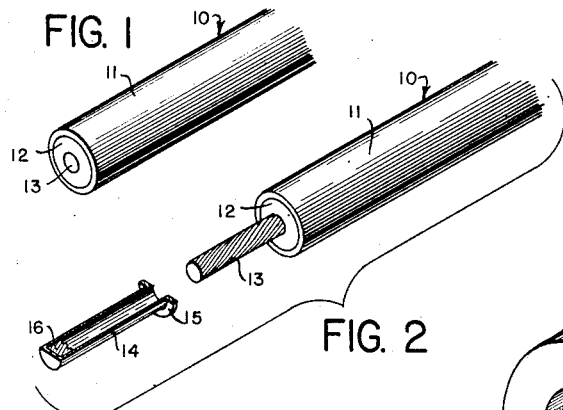
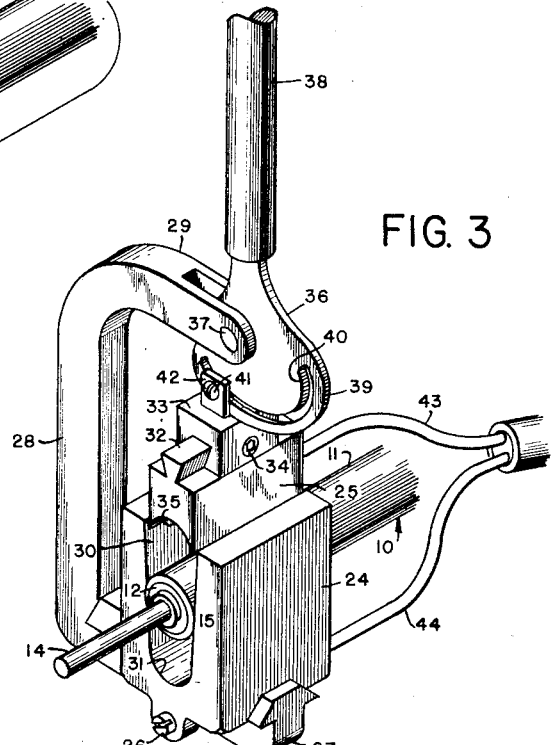
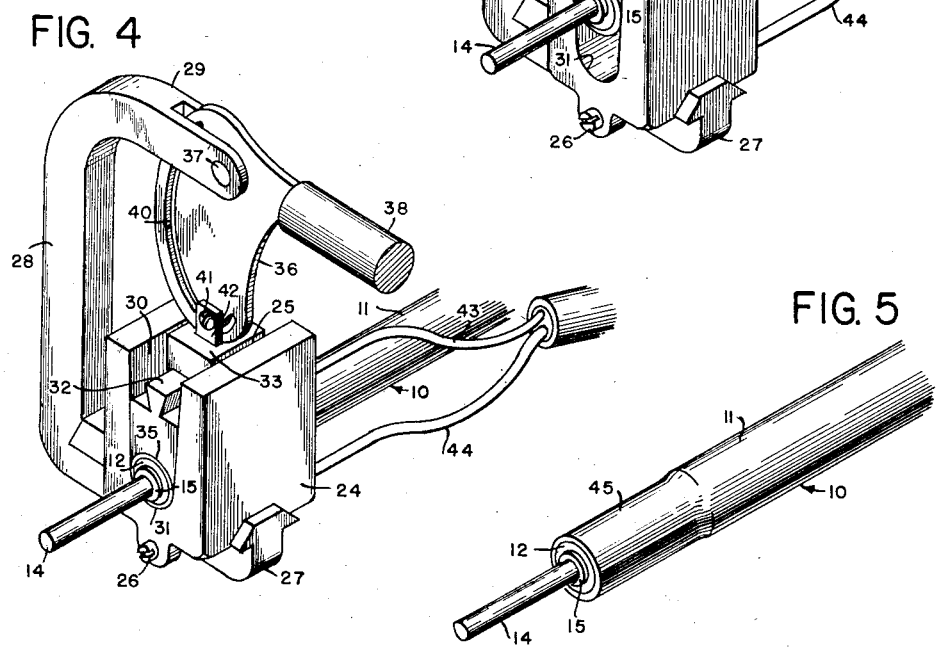
INVENTOR
LESLIE M. MERRILL
BY *Jarvis C. Marble*
ATTORNEY Nov. 5, 1957  L. M. MERRILL  2,812,506
WATERPROOF ELECTRICAL CABLE CONNECTION
AND METHOD OF MAKING THE SAME
Filed Nov. 17, 1950  2 Sheets-Sheet 2
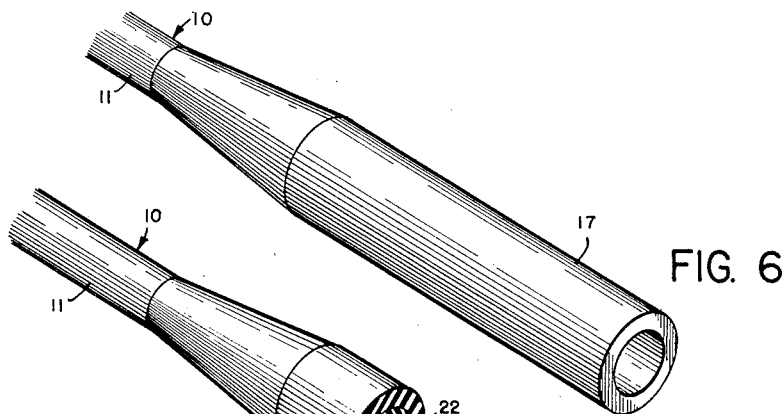
FIG. 6
FIG. 7
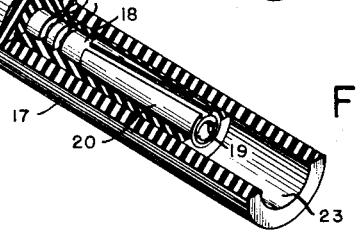
FIG. 8
FIG. 9
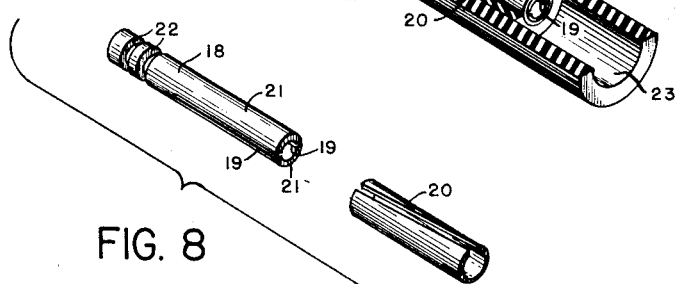
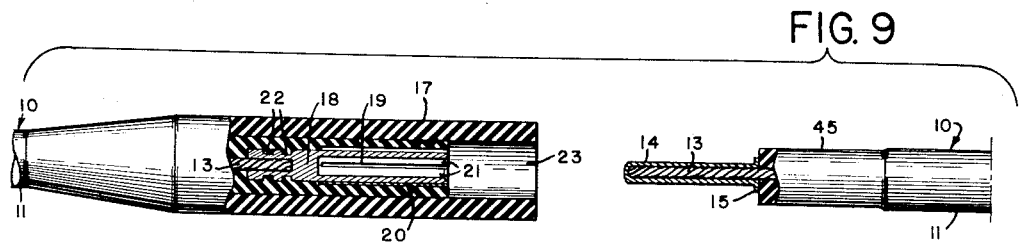
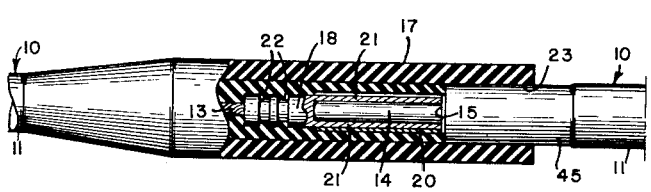
FIG. 10
INVENTOR
LESLIE M. MERRILL
BY *Jarvis C. Marble*
ATTORNEY United States Patent Office 2,812,506
Patented Nov. 5, 1957

2,812,506

WATERPROOF ELECTRICAL CABLE CONNECTION AND METHOD OF MAKING THE SAME

Leslie M. Merrill, Westfield, N. J., assignor to Elastic Stop Nut Corporation of America, a corporation of New Jersey Application November 17, 1950, Serial No. 196,304

9 Claims. (Cl. 339—60)

This invention relates to electricity and more particularly to a waterproof cable connection and to a method of making such a connection.

In the use of electrical cables, particularly those which are relatively heavily insulated and are intended for direct burial in the ground or in certain instances for use on top of the ground, considerable difficulty has been experienced in making a joint or connection in the field, which connection will be completely waterproof and will present a low resistance electrical path. It has heretofore been the custom to provide factory fabricated cable in which the connectors are provided at stated intervals and which are made up in the field into cables of any desired length. Obviously, such a system has serious drawbacks in that the length of cable desired cannot in many instances be accurately predicted, also very often it is desired to make T connections or take-offs from the main cable and usually there is no way to predict where these connections will be made. Consequently, prefabricated lengths of cable very often do not provide a break at or near the desired location. As a result some method whereby a practical field joint or connection may be made at any desired place is highly desirable.

Cable of the type utilized in electrical distribution systems with which this invention is primarily concerned has commonly been fabricated by an extrusion process which results in a cable in which the outside diameter may vary a considerable amount from one end of the cable to the other or may easily produce high and low spots throughout the length of such cable. This variation in diameter is not ordinarily of sufficient extent to have any particular bearing on the dielectric or insulating qualities of the cable but when utilized with an invention of this type it would be practically impossible to obtain joints of sufficient tightness to prevent leakage of moisture at such joints. Generally the cable for any particular application has been specified as having a minimum outside diameter and the variation in such diameter is usually above this minimum or in other words may vary from such minimum to a maximum and therefore provision must be made to utilize this commercially available cable in which such variations of diameter are normally found.

The cable with which this invention is concerned is widely used in prefabricated lengths in direct burial lighting systems for airport runways and the like and is also used in many military air bases where the cable is laid directly on top of the ground and which may be picked up and moved to a new location at a moment's notice. Obviously the most effective use of such systems in different installations which may require different locations and spacing of outlets is hampered by the fixed lengths of the prefabricated cable units and consequently the connection and process of making the same described below materially contribute to the efficient use of such cable, particularly in the locations and under the conditions encountered in such use.

It is accordingly an object of this invention to provide a cable connection which may be conveniently applied in the field and which will result in an efficient electrical connection of low resistance and at the same time provide a connection which is completely waterproof, thus permitting use of the same in locations such as burial in the earth or on top of the ground where moisture is present a large percentage of the time.

A further object of this invention is to provide an electrical connection utilizing male and female elements and in which the female portion of the connection is prefabricated at the factory and the male connection is applied in the field at any desired location in the cable.

It is a further object of this invention to provide an electrical connection in which the female element may be incorporated in a premolded cable and in which the operation of molding in no way impairs the efficiency of the female connector.

It is a further object of this invention to provide a highly effective disconnectable electrical connection which may readily be made in the field.

It is a further object of the invention to provide a process of making an electrical connection in a relatively heavily insulated cable in the field at any desired location in the cable.

It is a further object of the invention to provide a process of making an electrical connection in relatively heavily insulated cable which includes sizing of the cable at the connection in order to compensate for any variation in the external diameter thereof.

Further objects and advantages of the invention will be apparent from the following description taken in connection with the accompanying drawing, wherein:

Fig. 1 is a view in perspective showing a cable of the type to which the connection of this invention may be applied:

Fig. 2 an exploded view in perspective showing the cable prepared to receive the male connector and the male connector in the position it occupies prior to application to the cable;

Fig. 3 a view in perspective of the cable with the male connector applied thereto and showing a sizing tool for accurately molding tthe external surface of a portion of the cable to provide a section having the desired diameter;

Fig. 4, a view in perspective showing the sizing tool of Fig. 3 in closed or operative position and with the cable disposed in the position which it occupies upon completion of the molding operation;

Fig. 5 a view in perspective showing the completed male connection with the accurately sized portion of the cable somewhat exaggerated;

Fig. 6 a view in perspective showing the female portion of the connection of this invention;

Fig. 7 a view in perspective with parts broken away and in section for greater clarity and showing the internal structure of the female connector of Fig. 5;

Fig. 8 an exploded view in perspective showing the two elements which make up the female connector;

Fig. 9 an exploded elevational view with parts in section for greater clarity and showing the male and female portions of the connection in th positions they occupy prior to assembly with each other;

Fig. 10 an elevational view with parts in section for greater clarity and showing the male and female connectors assembled together to form the complete connection.

With continued reference to the drawing, there is shown in Fig. 1 a cable 10 having an outer covering or sheathing 11 of neoprene or other suitable material which is waterproof and which provides sufficient resistance to abrasion to permit the cable to be directly buried in the ground or to be laid on top of the ground and to be subjected to the normal wear encountered in such use, such as stones, gravel and also traffic such as vehicles passing thereover. The cable 10 is provided with an inner insulating portion 12 which may be of rubber or any other desired material and a conductor 13 in the form of stranded wires of any low resistance metal such as copper or aluminum, or, if desired, this conductor may be a solid strand.

In order to obtain both high dielectric properties and high resistance to external moisture, abrasion and other like factors usual practice at present is to provide cable with an inner insulating core of high dielectric strength and an outer sheathing of other and tougher material and such cable is shown here by way of example. The invention is however equally applicable to cables of the kind in which only a single covering is used of material having the required insulating properties and sufficient toughness to withstand the intended usage and as herein employed the term sheathing is to be understood as comprising the outer covering of the cable regardless of whether such covering is applied directly to the conductor or to an inner layer or core of special insulating material.

In order to achieve best results and to take full advantage of the potential benefits of the invention, consideration must be given to the material of which the sheathing is formed.

The sheathing should be non porous to both gases and liquids and should be substantially impervious to acids and alkalies of the kind and concentration ordinarily encountered in earth installations as well as resistant to the action of earth bacteria or fungus. It should be substantially impervious to deterioration from the action of the atmosphere, particularly with reference to the rays of the sun. It should be capable of resisting without adversely affecting its mechanical and electrical properties, extremes of temperature conditions from sub-zero temperatures to the high temperatures incountered in above ground insulations in tropic or desert locations. It should be relatively firm and non-frangible and preferably have a certain degree of elasticity. It should be as free as possible from inherent aging with time, it should have reasonably good physical properties particularly the quality of toughness and should have relatively high dielectric strength. As previously mentioned, flexible cable suitable for direct ground burial has previously been employed and in the development of such cable it has been found that in the present state of the materials art the class of materials which most satisfactorily meets requirements of the nature of those noted above are synthetic polymers of compounds productive of products generically known as "synthetic rubber" of which the following may be mentioned as examples: "GR–S" (Government Rubber Styrene) a polymeric product of butadiene and styrene; "low temperature rubber" also a polymeric product of butadiene and styrene; "neoprene" which is a generic term for a number of chloroprene polymers of different grades and designated as GR–M plus numerical designations for the several grades; "butyl rubber" a copolymer of isobutylene and isoprene; and "Buna N"; (GR–A Government Rubber Acrylonitrile) a copolymer of butadiene and acrylonitrile. To those skilled in the materials art it would be evident that a substantial variety of materials suitable for the purpose are available and that they need not be limited to synthetic rubbers in order to carry out the invention. Such other materials may include synthetic resins such as "polythene." The use of natural rubber, however, is not to be recommended, because of its inherent deterioration with time or so-called aging characteristic. The specific material employed will therefore be dictated by specific conditions in different cases.

Of the foregoing materials neoprene is one of the more satisfactory and for purposes of further description herein it will be assumed without limitation that neoprene is the material employed.

The male portion of the connection comprises an elongated tubular cap 14 having a flange 15 at the open end thereof, there being provided within this cap a relatively small quantity of solder or the like 16 which may be utilized to conveniently secure the cap 14 on the conductor 13. As shown in Fig. 2, the cable 10 has a portion of the covering 11 and 12 removed from the conductor 13 to expose a length thereof substantially equal to the length of the cap 14. In applying the cap 14 to the conductor 13, it is merely necessary to insert the conductor 13 and to apply heat to the cap 14 thus melting the solder 16 which flows evenly between the conductor 13 and the inner walls of the cap 14 to securely bond the two together and provide a low resistance electrical path. This operation completes the formation of the male portion of the connection with the exception of accurately sizing a portion of the cable 10 which operation will be presently described.

As shown in Figs. 6 and 10, the female portion of the connection comprises an enlarged molded portion 17 which may be formed in one piece with the cable 10 or may be separately molded and bonded to the cable 10 by a suitable heating and molding operation. Regardless of the method of manufacture, the net result is to provide a cable 10 and enlarged female connector housing 17 of substantially integral construction, and which is completely moisture proof.

The metallic portion of the female connector comprises a sleeve 18 having diametrically disposed slots 19 therein, although these slots need not be diametrically disposed and one slot or a plurality thereof may be utilized depending on the degree of resilience required for the particular application and the material used. As shown in Figs. 8, 9 and 10, the connector member 18 is enclosed for the split portion of its length by a split sleeve 20 which serves to reinforce the fingers 21 provided by the slots 19 and also to cover the slots 19 and prevent the flow of rubber, neoprene, or other material which may be used in the enlarged portion 17 into the slots 19 during the molding operation. The female connector member 18 may be provided with a plurality of longitudinally spaced annular grooves 22 which serve to firmly anchor the same in the enlarged portion 17 of the female connection, since the material of such portion flows into these grooves during the molding operation. A conductor 13 of the cable 10 may be secured in the connection 18 by soldering or any other desired method.

It is contemplated that the female portion of the connection will be prefabricated at the factory and, consequently, adequate molding equipment is available and may be utilized to mold the connector 18 and the sleeve 20 within the enlarged portion 17. It will be noted from an inspection of Figs. 7 and 9 that the connector 18 is positioned inwardly of the open end 23 of the portion 17, the wall of this opening 23 being accurately sized as to diameter for a purpose to be presently described. It is also to be noted that it is possible to provide an accurate diameter in the opening 23, since this is a molding operation whereas it is a practical impossibility with present manufacturing methods, usually extrusion, to provide an extremely accurate and uniform outside diameter of cable, which is usually supplied in bulk.

As shown in Figs. 9 and 10, the connection is completed by introducing the male connector 14 into the female connector 18 to provide an electrical path and at the same time the cable 10 enters the opening 23 in intimate contact with the wall thereof to provide a moisture-proof joint. Since, as stated above, cable of this type cannot be obtained having accurate outside diameters, some means is necessary to accurately size a portion at the end of the cable in order to permit proper engagement with the wall of the opening 23. For this purpose there may be provided a tool of the nature of that shown in Figs. 3 and 4 although this tool is shown for illustrative purposes only and obviously many other tools of different designs may be utilized for this purpose.

As previously mentioned, commercial grades of cable to which the present invention is primarily applicable cannot be supplied with accurately sized uniform outer diameter. Also, since the minimum size of the conductor and the minimum wall thickness of the covering are the controlling factors in the specification for cables designed to meet given voltage and load requirements, the outer diameters of cables for the same specification supplied by different manufacturers may vary to some extent.

Because of such variations the extent to which the diameter of the cable is reduced by the sizing operation will vary and in order to insure an accurately sized and uniform male connector portion the tool or other sizing means is preferably dimensioned to produce a sized cable portion of not less diameter than the minimum diameter tolerable under a given specification. Also, in order to insure the desired waterproof force fit the female connector is molded to provide an opening 23 with a diameter slightly smaller than the diameter of the reduced portion 45 with which it is to be used so that when the parts are assembled the male part will be slightly compressed and the female part slightly expanded, thus, if the nominal cable diameter required by a specification is one half inch the sizing means may for example, be designed to provide a reduced portion 45 having a diameter of 0.485 inch in order to take care of tolerance variations while the opeinng in the female connector to be used with it may have a diameter of 0.455 inch. In other words, if the diameter of the cable is slightly greater than the minimum diameter of cable for the given specification a sizing tool will operate to reduce this diameter and provide a portion 45 adjacent the end thereof having a diameter equal to the minimum diameter for the given specification and the female connector portion intended to cooperate therewith will be provided with an opening having a diameter slightly less than this minimum diameter in order to provide the desired press fit thus precluding entry of moisture to the joint.

As shown in Figs. 3 and 4 the tool may conveniently comprise a hand operated electrically heated molding device having a pair of molding jaws 24 and 25, jaw 24 being detachably secured by a set screw or the like 26 to one leg 27 of a C-clamp having an upstanding connecting portion 28 and an inwardly extending upper leg 29. Jaw 24 may be provided with a tapered groove 30 having an arcuate lower surface 31, the purpose of which will be presently described.

Upper jaw 25 may be provided with a dovetail portion 32 received in a complementary groove in a jaw carrier 33, the jaw 25 and carrier 33 being maintained in assembled relationship by a set screw or the like 34. Jaw 25 is provided in its lower surface with a semi-circular groove 35, the purpose of which will be presently described.

In order to move the upper jaw 25 toward and away from the lower jaw 24, there is provided a hand operated cam member 36 pivotally mounted at 37 on the inwardly extending arm 29, there being an actuating handle 38 attached to the cam 36. The lower surface 39 of the cam 36 engages the upper surface of jaw carrier 33 and upon actuation of the cam 36 about pivot 37 will move the jaw 25 carried thereby downwardly into the groove 30 in jaw 24 to the extent permitted by the contour of cam 36. In order to retract jaw 25 from jaw 24 there may be provided a slot 40 in the cam 36 which slot may be engaged by a pin or other suitable means 41 carried by upstanding ears 42 attached to the upper jaw carrier 33. As will be seen from an inspection of Figs. 3 and 4 operation of the cam 36 in the opposite direction will cause the slot 40 to cam the pin 41 upwardly and thus retract jaw 25 from jaw 24. Conductors 43 and 44 serve to supply upper and lower jaws 25 and 24 respectively with electrical energy for heating the same during the molding operation.

In operation after the male connector member 14 has been applied to the conductor 13 and soldered thereto the end portion of the sheath 11 of the cable 10 may be positioned in the tapered groove 30 in the lower jaw 24 as shown in Fig. 3. It is assumed that the jaws 24 and 25 are heated to the desired temperature and the handle 38 is actuated to move the cam 36 and thus force the upper jaw 25 downwardly into the tapered groove 30 with the semi-circular surface of the groove 35 in jaw 25 engaging the upper surface of the cable 10. Further movement of the upper jaw 25 will force the cable 10 downwardly until the surface thereof engages the arcuate surface 31 in the bottom of the groove 30 in lower jaw 24. Arcuate surface 31 and the semi-circular surface 35 in upper jaw 25 are complementary to each other and when the jaw 25 is in lowermost position as shown in Fig. 4, the opening therebetween presents a true circle of the desired diameter. The contour of the cam surface 39 is such that with the upper jaw 25 in the position shown in Fig. 4 the cam will automatically lock in position thus securing the upper jaw 25 in clamping position to mold the surface of the cable 10 to provide a portion of reduced diameter which is shown somewhat exaggerated at 45 in Figs. 5, 9 and 10. The jaws 24 and 25 may be retained in closed or clamped position as shown in Fig. 4 for the necessary time to effect a permanent reduction in diameter of cable 10 thus providing the accurately sized portion 45 which is adapted to engage the opening 23 in the female connector element with a tight or force fit to preclude entrance of moisture thereto.

As explained above, the jaws 24 and 25 are removable and obviously a plurality of jaws having the desired sizes may be supplied in order to accommodate the tool to different diameters of cable thus providing a tool which is versatile and which may be conveniently utilized to size any cable normally employed with the joint of this invention.

The above described sizing tool is by way of illustration only and obviously a power operated tool or a similar tool mounted on a bench may be employed but since the invention is primarily designed to be utilized in the field a hand tool of the type illustrated and described may be conveniently employed for the purpose.

If desired in practice, the female portion of the connector may be part of a unit of relatively short length, that is to say a relatively short female unit having a female connector prefabricated at each end thereof may be provided and the cable which has been laid provided with male connectors in accordance with this invention, thereby allowing a joint or connection to be conveniently made in the field and also the units having female connectors at each end may be provided to permit tapping the main cable for take-off purposes such as transformers or individual lights. The above described invention will find many uses in electrical distribution systems where cable of the type contemplated is utilized and as stated above is particularly applicable in systems where there is difficulty in predicting in advance the length of cable needed for the particular point where connections thereto are to be made. It has been found by actual test that the connector of this invention provides a joint with an extremely low electrical resistance flow path and also provides a connection which is substantially moisture-proof, the relatively tight engagement between the reduced surface 45 and the wall of the opening 23 preventing any entrance of water into the connector.

It will be obvious to those skilled in the art that various changes may be made in the invention without departing from the spirit and scope thereof and, therefore, the invention is not limited by that which is shown in the drawings and described in the specifications, but only as indicated in the appended claims.

What is claimed is:

1. A water-proof electrical cable connection for sheathed cable having a nominal minimum external diameter of the sheath comprising male and female elements, said female element comprising an enlarged portion of yieldable material substantially integral with and forming a part of the sheath of the cable, a split tubular member forming a female connector and a split sleeve enclosing the split portion of said tubular member with the splits in said tubular member and said sleeve angularly disposed with respect to each other, said tubular member being secured to the conductor of said cable and being secured against displacement within said enlarged portion inwardly of the end thereof, said sleeve preventing the flow of the material of said enlarged portion into the slits in said tubular member, the opening in said enlarged portion providing a cylindrical socket having a predetermined diameter slightly less than the nominal minimum diameter of the sheath of said cable, said male element comprising a metallic cap having a flange at the open end, said cap being received over and bonded to the conductor of said cable outwardly of the end of the sheath, a portion of the sheath of said cable adjacent said cap being cylindrical and having a reduced diameter of a predetermined size substantially equal to the nominal minimum diameter of the sheath of said cable, said cap engaging said split tubular member to provide an electrical connection and with the cylindrical reduced portion of the sheath of said cable engaging the cylindrical socket in said enlarged portion with a force fit to provide a water-proof joint.

2. A water-proof electrical cable connection for cable having a sheath of synthetic polymers of compounds productive of products generically known as "synthetic rubber" comprising male and female elements, said female element comprising an enlarged portion of yieldable material substantially integral with and forming a part of the sheath of said cable, a split tubular member forming a female connector and a split sleeve enclosing the split portion of said tubular member with the splits in said tubular member and said sleeve angularly disposed with respect to each other, said tubular member being secured to the conductor of said cable and being secured against displacement within said enlarged portion inwardly of the end thereof, said sleeve preventing the flow of the material of said enlarged portion into the slits in said tubular member, the opening in said enlarged portion providing a cylindrical socket having a predetermined diameter, said male element comprising a metallic cap having a flange at the open end, said cap being received over and bonded to the conductor of said cable outwardly of the end of the sheath, a portion of the sheath of said cable adjacent said cap being cylindrical and having a reduced diameter of a predetermined size slightly larger than the opening in said enlarged portion, said cap engaging said split tubular member to provide an electrical connection and with the reduced portion of the sheath of said cable engaging the opening in said enlarged portion with a force fit to provide a water-proof joint.

3. A water-proof electrical cable connection as defined in claim 2 in which the material of the sheath is neoprene.

4. The method of making a waterproof electrical cable connection for sheathed cable comprising providing a female element having an enlarged molded portion substantially integral with the sheath of said cable, a female connector secured to the conductor on the cable and being molded within said enlarged portion inwardly of a cylindrical opening therein, the opening in said enlarged portion having a predetermined diameter less than the minimum tolerance limit for the nominal diameter of said sheathed cable, providing a male connector element comprising a metallic cap having a quantity of bonding material therein, stripping a length of the sheath from the end of the conductor of the cable, applying said cap to said conductor outwardly of the end of the sheath and heating the same to provide a bond therebetween, reducing a relatively short portion of the sheath of said cable adjacent said cap to cylindrical form having a diameter slightly larger than the opening in said enlarged portion and having a predetermined relation to the diameter of said opening and inserting said cap in said female connector to provide an electrical connection and inserting said portion of the sheath of predetermined larger diameter into the opening in said enlarged portion to provide a waterproof joint.

5. The method of making a water-proof electrical cable connection for sheathed cable having a nominal minimum external diameter of the sheath comprising providing a female element having an enlarged molded portion substantially integral with the sheath of said cable, a female connector secured to the conductor of said cable and being molded within said enlarged portion inwardly of the end thereof, a cylindrical opening in said enlarged portion having a predetermined diameter slightly less than the minimum tolerance limit for the nominal diameter of said cable, providing a male connector element, securing said male connector element to the conductor of said cable, reducing a relatively short portion of the sheath of said cable adjacent said male element to cylindrical form having a diameter slightly larger than and having a predetermined relation to the nominal minimum diameter of said cable and inserting said male element into said female connector to provide an electrical connection and inserting said portion of sheath of predetermined diameter into the opening of said enlarged portion with a force fit to provide a waterproof joint.

6. The method of making a water-proof electrical cable connection for sheathed cable having a nominal minimum external diameter of the sheath comprising providing a female element having an enlarged molded portion substantially integral with the sheath of said cable, a female connector secured to the conductor of said cable and being molded within said enlarged portion inwardly of the end thereof, a cylindrical opening in said enlarged portion having a predetermined diameter slightly less than the minimum tolerance dimension for the nominal minimum diameter of the sheath of said cable, providing a male connector element comprising a metallic cap having a quantity of solder therein, stripping a length of the sheath from the end of the conductor of the cable, applying said cap to said conductor and heating the same to provide a solder bond therebetween, reducing a relatively short portion of the sheath of said cable adjacent said cap to a cylinder having a diameter slightly greater than and having a predetermined relation to the diameter of said opening to the nominal minimum diameter of the sheath of said cable and inserting said cap in said female connector to provide an electrical connection and inserting said portion of the sheath of reduced diameter into the opening of said enlarged portion with a force fit to provide a waterproof joint.

7. A waterproof electrical cable connection for sheathed cable comprising male and female elements, said female element comprising an enlarged portion of elastically yieldable material integral with and forming a continuation of the sheath of the cable and providing a cylindrical socket at the free end of the cable having a predetermined diameter, a tubular member providing a female connector, said tubular member being secured to the conductor of said cable and secured against axial displacement within said enlarged portion inwardly of the open end of said socket, said male element comprising a metallic cap, said cap being received over and bonded to the conductor of said cable outwardly of the end of the sheath thereof, a portion of the sheath of said cable adjacent to said cap being of cylindrical form and having a predetermined diameter slightly larger than the diameter of said socket, said cap engaging said tubular member to provide an electrical connection and said portion of said sheath of predetermined diameter engaging said socket to provide a cylindrical waterproof joint of which the outer member thereof is elastically expanded by the inner member.

8. A waterproof electrical cable connection for sheathed cable comprising male and female elements, said female element comprising an enlarged portion of elastically yieldable material integral with and forming a continuation of the sheath of the cable and providing a cylindrical socket of predetermined diameter outwardly of the end of the sheath of said cable, a split tubular member forming a female connector and a split sleeve enclosing the split portion of said split tubular member, the splits in said tubular member and in said sleeve being angularly disposed with respect to each other, said tubular member being secured to the conductor of said cable, said tubular member and said enclosing sleeve being located within said socket and secured against axial displacement inwardly of the end of the socket, said sleeve acting to prevent flow of the material of said enlarged portion into the slits in said tubular member, said male element comprising a metallic cap, said cap being received over and bonded to said cable outwardly of the end of the sheath thereof, a portion of the sheath of said cable adjacent to said cap being of cylindrical form and of reduced diameter of a predetermined size slightly larger than the diameter of said socket, said cap engaging said split tubular member to provide an electrical connection, the reduced portion of the sheath of said cable engaging said socket and expanding the wall of said enlarged portion to provide a waterproof joint between the parts.

9. A waterproof electrical cable connection for sheathed cable having a nominal minimum external diameter of the sheathing and comprising male and female elements, said female element comprising an enlarged portion of yieldable material integral with and forming a continuation of the sheath of the cable and providing a cylindrical socket of predetermined diameter slightly less than said nominal minimum diameter, a female connector secured to the conductor of said cable and secured against axial displacement within said socket, said male element comprising a metallic cap, said cap being received over and bonded to the conductor of said cable outwardly of the end of the sheath thereof, a portion of the sheath of said cable adjacent to said cap being of cylindrical form and having a predetermined diameter substantially equal to said nominal minimum diameter, said cap engaging said female connector to provide an electrical connection, said portion of the sheathing of predetermined diameter substantially equal to said nominal minimum diameter and adjacent to said cap engaging the wall of said socket with a force fit expanding the wall of the socket to provide a waterproof joint between the parts.

References Cited in the file of this patent

UNITED STATES PATENTS

| | | |
|---|---|---|
| 330,874 | Cobb | Nov. 24, 1885 |
| 1,188,055 | Faile | June 20, 1916 |
| 1,642,514 | Simons | Sept. 13, 1927 |
| 1,969,866 | Wild et al. | Aug. 14, 1934 |
| 1,975,833 | Doane | Oct. 9, 1934 |
| 1,981,460 | Miller | Nov. 20, 1934 |
| 2,059,008 | Marquart | Oct. 27, 1936 |
| 2,332,376 | Haberger | Oct. 19, 1943 |
| 2,346,831 | Drury | Apr. 18, 1944 |
| 2,367,512 | McFadden | Jan. 16, 1945 |
| 2,379,942 | Webber | July 10, 1945 |
| 2,396,872 | Miller et al. | Mar. 19, 1946 |
| 2,471,592 | Thomson | Mar. 31, 1949 |
| 2,651,025 | Elliott | Sept. 1, 1953 |
| 2,677,115 | Stevens | Apr. 27, 1954 |

FOREIGN PATENTS

| | | |
|---|---|---|
| 191,317 | Switzerland | Aug. 16, 1937 |
| 218,814 | Germany | Feb. 10, 1910 |
| 286,966 | Great Britain | Mar. 15, 1928 |